March 4, 1969  B. K. HUTCHERSON  3,430,724
INTERACTING STEERING-SUSPENSION SYSTEM FOR
A SELF-PROPELLED OR TOWED VEHICLE
Filed Nov. 15, 1967
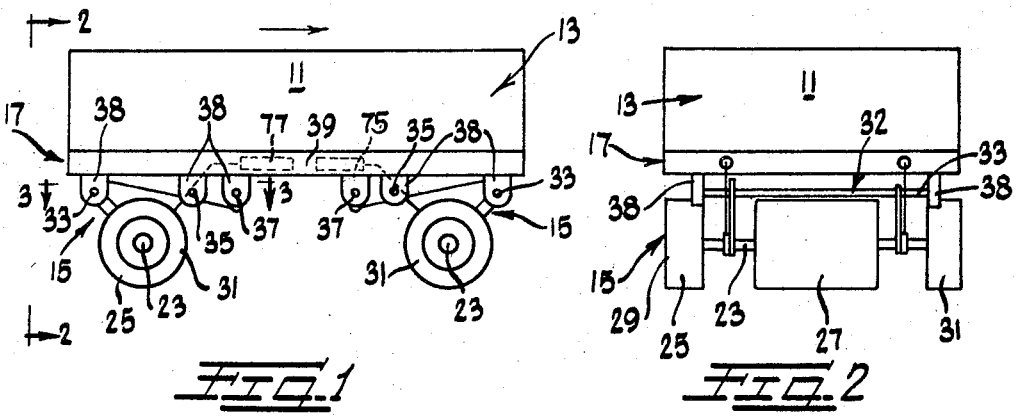
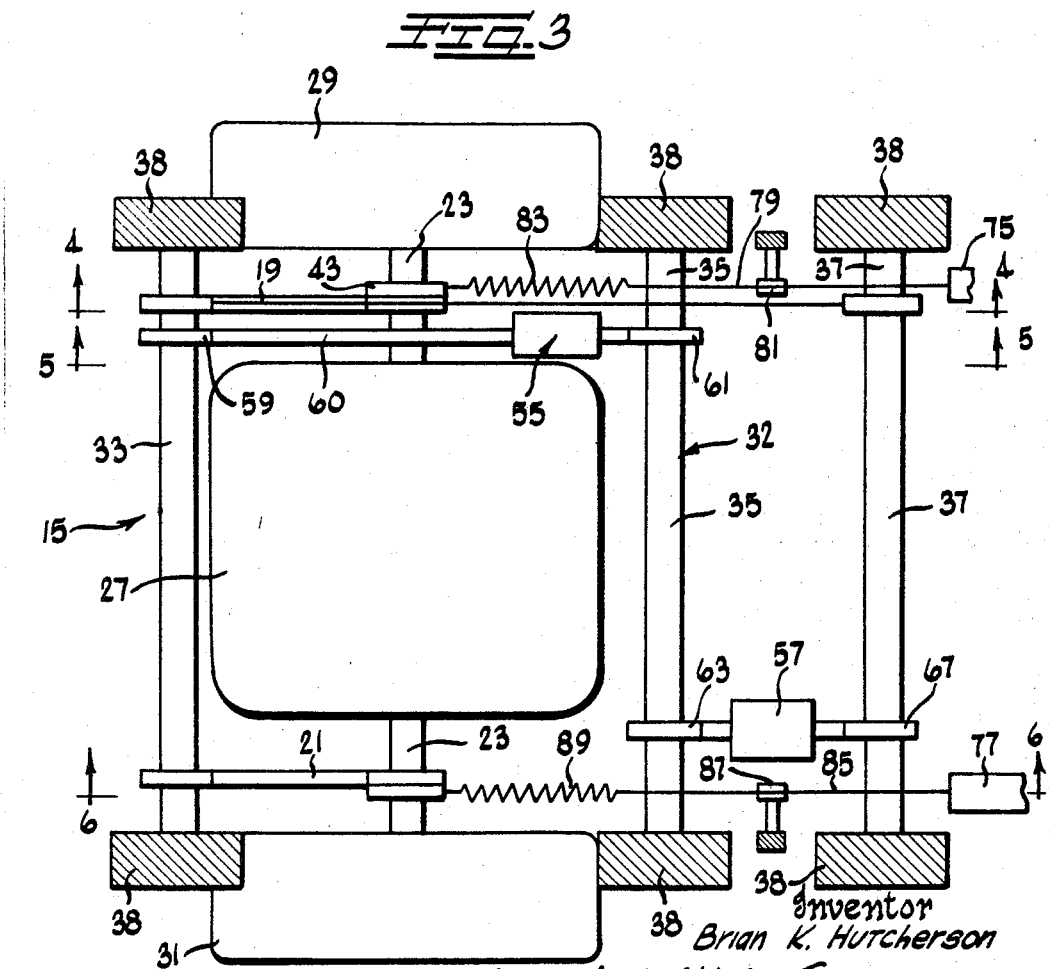
Inventor
Brian K. Hutcherson
Anderson, Luedeka, Fitch, Even & Tabin Attorneys

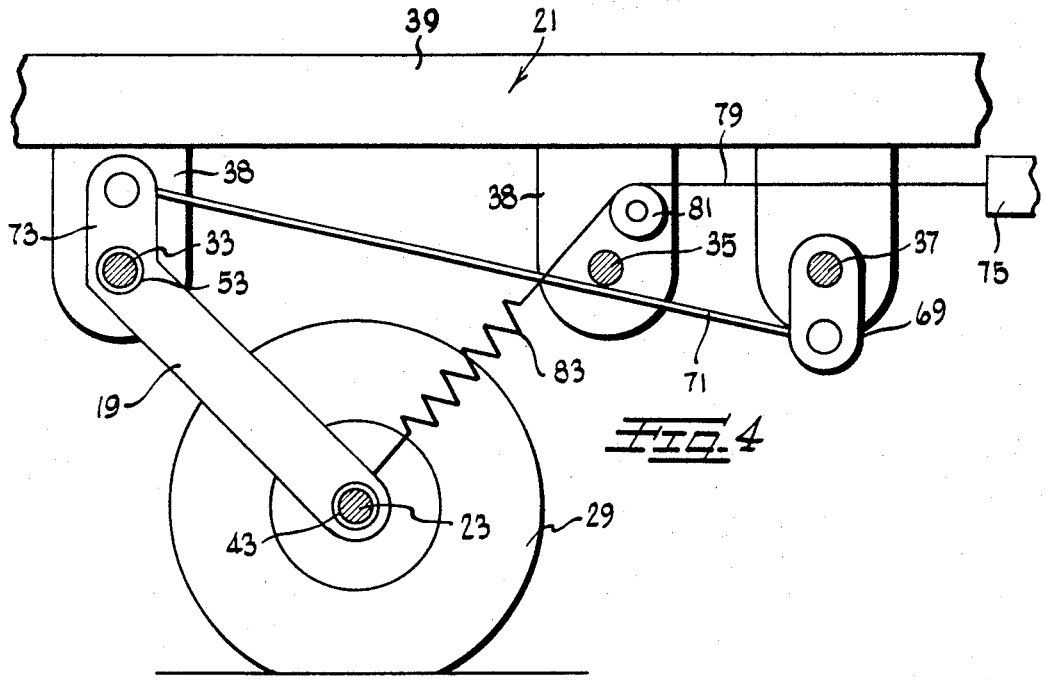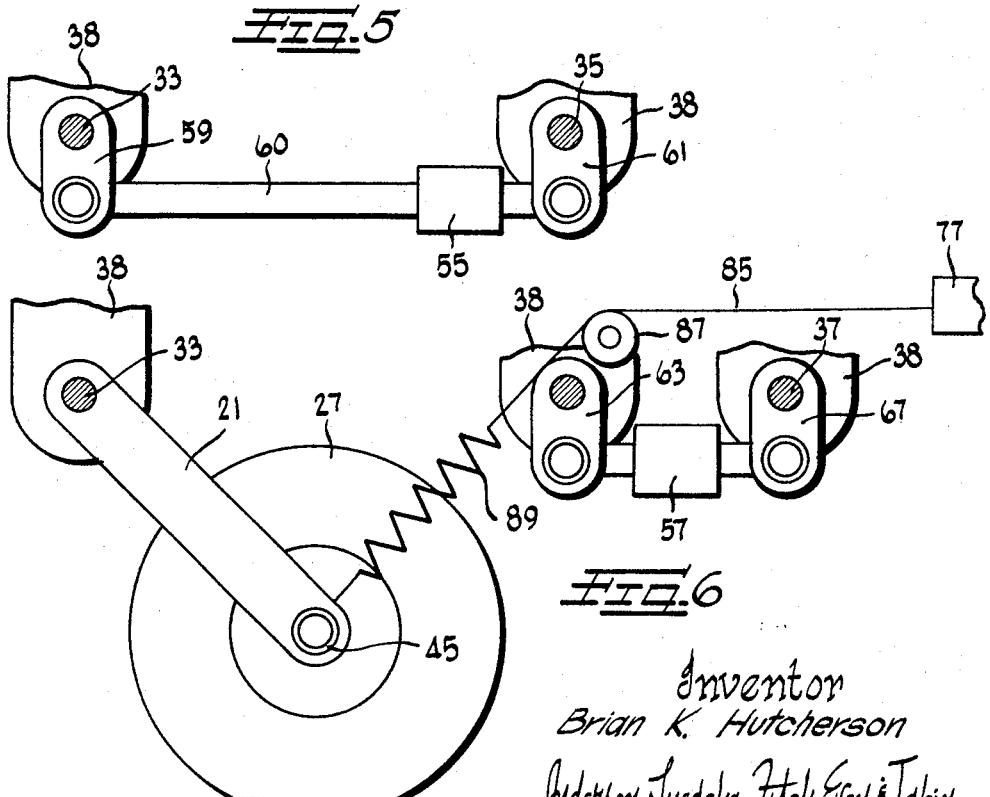

March 4, 1969

B. K. HUTCHERSON 3,430,724

INTERACTING STEERING-SUSPENSION SYSTEM FOR A SELF-PROPELLED OR TOWED VEHICLE

Filed Nov. 15, 1967

Inventor
Brian K. Hutcherson

Anderson, Luedeka, Fitch, Even, & Tabin
Attorneys

United States Patent Office 3,430,724
Patented Mar. 4, 1969

3,430,724
INTERACTING STEERING-SUSPENSION SYSTEM FOR A SELF-PROPELLED OR TOWED VEHICLE
Brian K. Hutcherson, Box 712, Oswego, Ill. 60543
Filed Nov. 15, 1967, Ser. No. 683,358
U.S. Cl. 180—79       5 Claims
Int. Cl. B62d 3/02, 21/14, 37/00

ABSTRACT OF THE DISCLOSURE

A steering-suspension system is provided for a vehicle which suspension system includes both front and rear wheel carrying suspensions both of which are steerable. Each suspension system unit is attached to the body of the vehicle and mounts a wheel carrying axle on which are mounted a plurality of wheels. Each suspension unit includes a plurality of torsion bars which are interconnected such that their respective lengths are cumulative to provide an angular twisting with torque equivalent to that experienced with an extremely long torsion bar. The vehicle is turned by increasing the wheel-base on the side of the vehicle opposite the center of the curve.

---

This invention relates to a vehicle, and more particularly to a heavy vehicle with a suspension system which facilitates turning of the vehicle.

Certain heavy vehicles, such as marginal terrain vehicles, have very large and wide wheels with relatively low pressure inflation for carrying extremely heavy loads on very low unit bearing pressure. Such wheels have wide contact areas with the supporting terrain or road and are often used to transport loads over sandy, marshy or other areas over which smaller width wheels with higher unit bearing pressures cannot easily roll.

A suspension system for such vehicles must be able to withstand heavy loads and yet have sufficient resiliency to cushion the load against shocks or vibrations being experienced by the wheels as they move along what is often rugged terrain. Because the wheels have long and relatively wide areas of contact with the ground, the wheels are difficult to turn, particularly when heavily loaded. Ideally, the steering-suspension system should be capable of short, sharp turns as well as long, wide arcuate turns.

An object of the present invention is to provide an improved suspension system for a heavy vehicle which facilitates the turning of the vehicle.

Other objects and advantages of the invention will become apparent from the detailed description in connection with the accompanying drawings in which:

FIGURE 1 is a side elevational view of a heavy vehicle embodying the novel features of the invention;

FIGURE 2 is a view taken along the lines 2—2 of FIGURE 1;

FIGURE 3 is an enlarged cross-sectional view taken along the lines 3—3 of FIGURE 1;

FIGURE 4 is a cross-sectional view taken along lines 4—4 of FIGURE 3;

FIGURE 5 is a cross-sectional view taken along lines 5—5 of FIGURE 3;

FIGURE 6 is a cross-sectional view taken along lines 6—6 of FIGURE 3;

Figure 7:
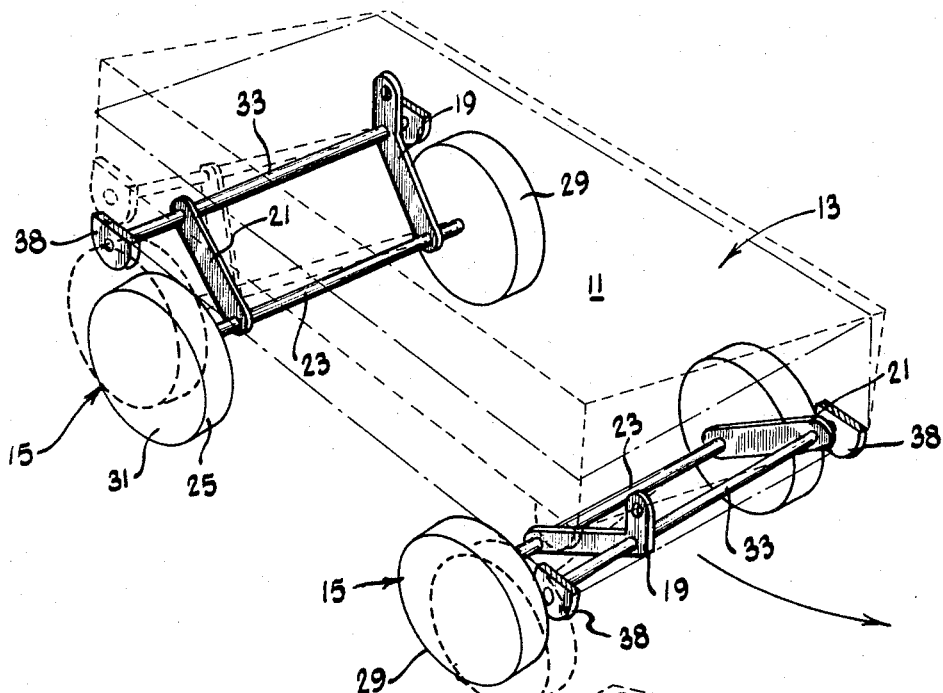
FIGURE 7 is a diagrammatic view of the vehicle shown in FIGURE 1 making a left hand turn.

As shown in the drawings, the invention, very generally is embodied in a heavy vehicle 11 (FIGURE 1) in the form of a self-propelled vehicle having a platform 13 adapted to receive a heavy load of material, power unit, and operator's controls. The body platform 13 is supported by identical front and rear wheel carrying suspensions 15 both of which are steerable as will be explained in detail. Each suspension unit is attached to a frame 17 which carries the body platform 13, and includes a pair of axle support arms 19 and 21 (FIGURE 3) each pivotally connected at its upper end to the frame and extending downward at an angle to the vertical to an opposite end of a wheel carrying axle 23. The axle carries a plurality of wheels (designated generally by the reference character 25) which in this instance, includes a wide center wheel 27 (FIGURE 2) disposed centrally between a pair of smaller width, outer wheels 29 and 31. Each suspension unit 15 includes a plurality of torsion bars 32 (FIGURE 2) which are interconnected between the upper ends of the support arms 19 and 21 so that the respective lengths of the bars are cumulative to provide an angular twisting with torque equivalent to that experienced with an extremely long torsion bar.

The vehicle is turned by changing the wheel base of one side relative to the other. This is accomplished by decreasing the vertical angle of one of the support arms 19 and 21 in both the front and rear suspensions by pivoting the arm about its upper end. This action lifts the side of the vehicle opposite the center of curvature (FIGURES 7 and 8), thus making the vehicle lean into the curve.

Proceeding now with the detailed description of the invention, the invention is described in connection with the self-propelled type heavy vehicle 11 which includes a generally rectangular body platform 13 adapted to carry a load, power unit, and operator and controls. The body platform may be, for example, approximately 8 feet in width and 16 feet in length. The body platform 13 is supported by the rectangular frame 17 which in turn is supported by two suspension units 15 which are identical but rotated 180 degrees relative to each other. Also, a conventional suspension unit (not shown) may be provided at the center of the vehicle which allows the axle vertical movement, but does not allow the axle to displace from a relatively normal axis to the longitudinal axis of the vehicle. Each suspension unit 15 carries the rotatably mounted center wheel 27 and two rotatably mounted outer side wheels 29 and 31. The wheels 27, 29 and 31 may, for example, have an outer diameter of 44 inches, the outer wheels 29 and 31 being 18 inches wide and the center wheel 27 being 41 inches wide. The particular dimensions of the vehicle and wheels are by way of illustration only and the present invention is not to be construed as limited to these dimensions or number of suspension units or to the illustrated and described form of vehicle.

Each suspension unit 15 includes a plurality of torsion bars 32 for spring mounting the associated end of the vehicle frame 17 relative to the wheels 25. In the illustrated embodiment, three parallel spaced torsion bars 33, 35, and 37 (FIGURES 1 and 3) are provided which span across the frame 17 and extend substantially normal to the frame 17. Each of the torsion bars 32 is journaled for turning movement relative to the frame 17 by suitable bearings 38 which are connected to opposite longitudinally extending beams 39 of the frame 17.

For purposes of description, the rear suspension system is described hereinafter and this rear suspension is described as viewed from a position at the rear of the vehicle and looking forward in the direction of travel. Pivotally mounted at the left end of the rearmost torsion bar 33 is the axle support or left carrier 19 (FIGURES 3 and 6) which is in the form of a rigid lever or arm extending forward toward the center of the vehicle and downwardly to the axle 23. The lower end of the axle support 19 carries a bearing 43 through which projects one end of wheel axle 23 which rotates in the bearing 43 as the wheels revolve during vehicle movement. The opposite end or right end of the wheel axle 23 is journaled for rotation in a similar manner in a bearing 45 (FIGURE 4) carried in the lower end of the other axle carrier 21 in the form of a rigid lever or arm which extends downwardly and forward toward the center of the vehicle. For reasons to be explained hereinafter, this right axle carrier 21 is fixed rigidly to the rearmost torsion bar 33, as by welding. The left axle support 19 is mounted on a bearing 53 and is allowed to turn independently of the torsion bar 33.

The left and right axle carriers 19 and 21 are interconnected through the medium of the torsion bars 33, 35, and 37 and a pair of actuating means 55 and 57, described hereinafter so that the torsion bars are, in effect, connected in series between the axle carriers 19 and 21. More particularly, the left end of the rear torsion bar 33 is fixed, as by welding, to the upper end of a depending crank arm 59 (FIGURE 5). The lower end of the crank arm 59 is rotatably connected to the end of a horizontally extending rod 60 which, in turn, is connected to the first actuating means 55. The actuating means 55 is rotatably connected to the lower end of a dependent crank arm 61 fixed to the left end of the intermediate torsion bar 35. The other or right end of the intermediate torsion bar 35 is fixedly connected to the upper end of a dependent crank arm 63 (FIGURE 6). The lower end of the crank arm 63 is connected through the second actuating means 57 to the lower end of a dependent crank arm 67 which is fixed to and depending from the right end of the third or forward torsion bar 37. The other or left end of the torsion bar 37 is attached as by welding, to an upper end of a depending crank 69 (FIGURE 4) which is connected at its lower end to a connecting member 71 which in the illustrated embodiment is in the form of a cable. The cable 71 is fixed to the crank 69 and extends toward and is attached to an upper end of an upward extension 73 of the left axle support arm 19.

The illustrated actuating means 55 and 57 are hydraulic actuators or rams. However, any type actuator may be used including but not limited to air cylinders or rams, mechanical ratchets or winches, and electric rotary or linear actuators (e.g. solenoids).

The support arms 19 and 21 are respectively positioned at preselected vertical angles, preferably at 45 degrees, by equalizing cylinders 75 and 77 which are mounted to the frame 17. The left equalizing cylinder 75 is connected to a cable 79 which passes over a sheave 81 rotatably mounted to the frame 17 and is connected through a tension spring 83 to the left bearing ring 43 on the axle 23. Likewise, the right cylinder 77 is connected to a cable 85 which passes over a sheave 87 and is connected to a spring 89, which in turn is connected to the right bearing 45. A shock absorber or dampener (not shown) may be mounted along the same axis as springs 83 and 87.

Figure 8:
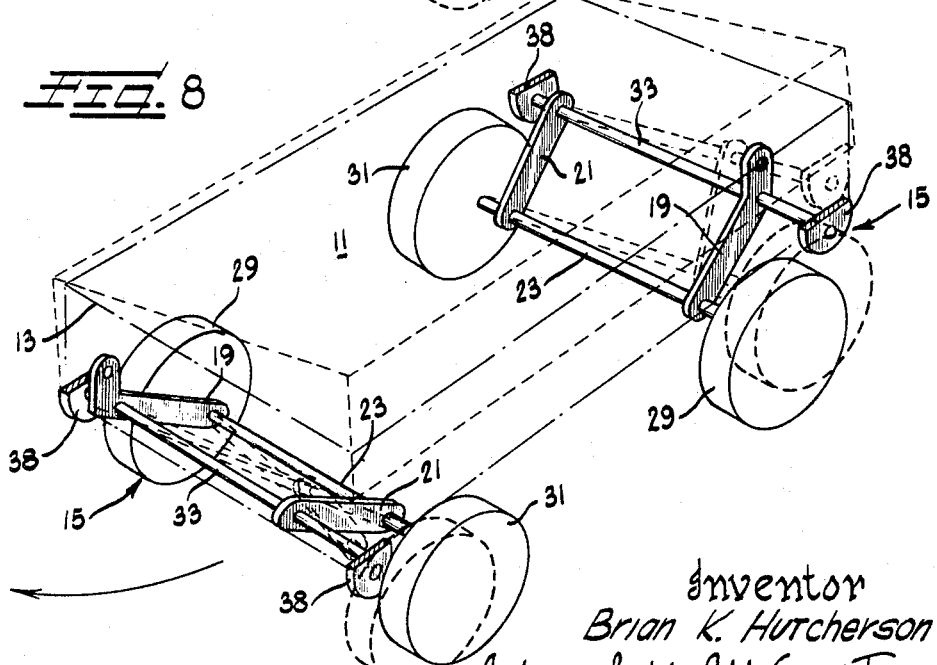
FIGURE 8 is a diagrammatic view of the vehicle shown in FIGURE 1 making a right hand turn.

To turn the vehicle, the equalizing cylinder 75 or 77 on the side of the vehicle toward the direction of the turn is held relatively fixed. The opposite equalizing cylinder 75 or 77 on the side of the vehicle opposite the turn is allowed to expand thus releasing the residual holding force on cable 79 or 85, thus allowing wheel 29 or 31 to increase the wheelbase on one side of the vehicle. This allows a continuum between a curve with an infinite radius through an extremely tight, small radius curve. This is best seen in FIGURES 7 and 8, wherein both axles 23 are shifted from a position in which they are substantially perpendicular to the longitudinal axis of the body, as shown in solid line, to a position in which they are no longer perpendicular and thus causing the vehicle to turn as illustrated by the dotted position of the axles 23. To shift the axles to the dotted line position as in FIGURE 8 the equalizing cylinder 77 (on the front suspension unit relative to the direction of travel) is released allowing the wheel 31 on the left side of the vehicle to move forward, thus increasing the wheel base of the left side. The equalizing cylinder 75 is held constant thus holding wheel 29 on the right side relatively fixed. On the rear suspension unit (relative to the direction of travel and as viewed from the rear of the vehicle) the equalizing cylinder 75 is released allowing the wheel 29 on the left side of the vehicle to move rearward, thus further increasing the wheel base of the left side. The equalizing cylinder 77 is held constant, thus holding the wheel 31 on the right side relatively fixed. These combined actions cause the vehicle to turn to the right. To turn to the left, the exact opposite operation is performed.

In either a left or right turn, the vehicle is raised on the side opposite the center of the radius of curvature of the curve. This is the result, for example in the right hand turn shown in FIGURE 8, of the axle carrier 19 in the rear suspension rotating counter-clockwise around bearing 53 and axle carrier 21 in the front suspension rotating clockwise around torsion bar 33.

The torsion bars are sized to accept a greater load than the maximum permissible gross vehicle weight. Thus, when the vehicle is loaded to the maximum, there is still tension on the cables 79 and 85 and, for any loading less than maximum, a greater tension is exerted on the cable 79 and 85. This will cause the spring action of the torsion bars to be relatively constant between the extremes of the empty vehicle and with maximum load. The spring rate of the torsion bars will also be relatively constant, regardless of load.

Another method of adjusting the angle of the axle carrier arms 19 and 21 in both static loading and dynamic moving operations is to actuate cylinders 55 and 57. For turns, the equalizing cylinder 75 or 77 closer to the center of the desired curve is held constant while the other equalizing cylinder 75 or 77 is released and at the same time either one or both of the cylinders 55 and 57 is actuated.

From the foregoing, it will be seen that the suspension units are capable of being operated to positions which lift one side of the vehicle relative to the other side of the vehicle so that the body leans into the turn. For less sharp turns or vernier steering adjustments, the equalizing cylinders 75 and 77 for the suspension may be operated without operation of the lifting cylinders 55 and 57.

The torsion bars act as springs to cushion the load. For example, when the rear wheels go over a bump, the rear axle 23 moves up toward the body and twists the bar 33 at its connection with the axle support 21. Between the axle support 21 and the crank 59, the bar 33 will be in torsion and acts as a spring. The crank 59 pushes the rod 60 and cylinder 55 forward to exert a counterclockwise torque on the crank 61 (FIGURE 5) and the left end of the torsion bar 35. Simultaneously, the opposite wheel 29 moves upward, rotates its axle support 19 counterclockwise and exerts pull on the cable 71 to turn the crank 69 clockwise as viewed in FIGURE 4. Consequently, the crank 69 places the forward torsion bar 37 in torsion between the cranks 69 and 67. The crank 67 also exerts through the cylinder 57 a clockwise torque on the crank 63 and torsion bar 35. Thus, the torsion bar 35 is in torsion between the cranks 63 and 61. As each torsion bar 33, 35 and 37 is in torsion, they act cumulatively to spring cushion the load. As the rear wheels move past the bump in the terrain, the torsion bars unwind and force the wheels down. If only one wheel 29 or 31 moves vertically, e.g., when going over a bump or into a depression, the force is transmitted through the above described connections to the opposite wheel.

The angular disposition of the axle supports 19 and 21 may be maintained when adding load to the chassis by operating the cylinders 55 and 57 to extend their rams and provide an offsetting torque on the axle supports. By varying the space between the arm 61 and 63, the effective length of the torsion bars may be reduced, or ram 60 may be attached directly to depending arm 69. The effective length of the torsion bars may be increased by adding more individual bars. (The longer the bar in relation a unit weight, the lower the spring rate.)

For most speeds and curves it is possible to exactly counter-balance centripetal force experienced on a curve by expanding and/or retracting the equalizing cylinders 75 and 77 in unequal lengths. This counter-balancing results from the ratio of horizontal movement to vertical movement of the axle being greater as the vertical angle of the support arm 19 or 21 decreases.

From the foregoing, it will be seen that the parallel torsion bars are interconnected with the twist of one bar being imparted to the next bar in a manner to provide a relatively large amount of vertical movement and spring deflection. The torsion bars also provide a simple and efficient manner of mounting the suspension which is formed of relatively few but very rugged pieces. Also, by actuating the appropriate lifting cylinders, the body is maintained at a relatively fixed height relative to the axles with increasing loading on the body.

What is claimed is:

1. In a vehicle, a body having a longitudinal axis, front and rear wheel axles, a pair of suspensions, said suspensions mounting said body to respective axles and steerable to turn said respective axles from a position substantially normal to said axis to turn the vehicle to the left or the right, one of said suspension including a pair of axle support arms each pivotally connected at its upper end to said body and extending downwardly at an angle to the vertical and connected at its lower end to an opposite end of said axle, and means coupled to said axle support arms normally hold said axle support arms at said angle to the vertical and further including power means operable to change the angle to the vertical of at least one of the arms to effect a vertical movement of the side of said body above said arms and to shift its corresponding axle end longitudinally relative to said other axle end.

2. The vehicle of claim 1 in which each suspension includes first and second torsion bars journaled in said body and extending substantially parallel to said axle and normal to said longitudinal axis of said body, in which a first one of said pair of axle support arms is fixed at its upper end to the corresponding end of said first torsion bar and the other of said axle supports is journaled on the other end of said second torsion bar for twisting said the corresponding end of said second torsion bar, and in which said power means includes actuating means coupled to said corresponding end of said first torsion arm and the other end of said second torsion bar for twisting said bars in the same direction.

3. The vehicle of claim 2 in which said power means further includes a pair of steering means each interconnected to said body and an opposite end of said wheel axle for positioning said arms in preselected positions and selectively allowing said axle support to change its angle of inclination to the vertical.

4. The vehicle of claim 2 in which each suspension includes a third torsion bar journaled in said body intermediate of and parallel to said first and second torsion bars, and in which said power means includes first and second lifting cylinder means, one of said cylinder means being connected between said corresponding end of said first torsion bar and a corresponding end of said third torsion bar for twisting said first and third bars in opposite directions and the other cylinder means being connected between the other end of said third torsion bar and said other end of said second torsion bar for twisting said second and third torsion bars in opposite directions.

5. The vehicle of claim 3 in which each suspension includes a third torsion bar journaled in said body intermediate of and parallel to said first and second torsion bars, and in which said power means includes first and second lifting cylinder means, one of said cylinder means being connected between said corresponding end of said first torsion bar and a corresponding end of said third torsion bar for twisting said first and third bars in opposite directions and the other cylinder means being connected between the other end of said third torsion bar and said other end of said second torsion bar for twisting said second and third torsion bars in opposite directions.

References Cited

UNITED STATES PATENTS

| | | | |
|---|---|---|---|
| 2,540,279 | 2/1951 | Mosier | 280—124 |
| 2,887,322 | 5/1959 | De Monge | 280—112 |
| 3,099,460 | 7/1963 | Sheehan | 280—104.5 |
| 3,339,940 | 9/1967 | Anthony | 280—87.01 |

LEO FRIAGLIA, *Primary Examiner.*

L. DANIEL MORRIS, JR., *Assistant Examiner.*

U.S. Cl. X.R.

280—6, 43, 112, 124

UNITED STATES PATENT OFFICE
CERTIFICATE OF CORRECTION

Patent No. 3,430,724

March 4, 1969

Brian K. Hutcherson

It is certified that error appears in the above identified patent and that said Letters Patent are hereby corrected as shown below:

Column 5, line 46, "second torsion bar for twisting said" should read -- first torsion bar and connected to --.

Signed and sealed this 24th day of March 1970.

(SEAL)
Attest:

Edward M. Fletcher, Jr.
Attesting Officer

WILLIAM E. SCHUYLER, JR.
Commissioner of Patents